US012704104B2

(12) United States Patent
Ogawa et al.

(10) Patent No.: US 12,704,104 B2
(45) Date of Patent: Aug. 11, 2026

(54) FUEL PRESSURE ACCUMULATING DEVICE

(71) Applicant: MITSUBISHI HEAVY INDUSTRIES ENGINE & TURBOCHARGER, LTD., Sagamihara (JP)

(72) Inventors: Hisao Ogawa, Kanagawa (JP); Yosuke Kitamura, Kanagawa (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 18/561,265

(22) PCT Filed: May 26, 2022

(86) PCT No.: PCT/JP2022/021652
§ 371 (c)(1),
(2) Date: Nov. 15, 2023

(87) PCT Pub. No.: WO2022/270227
PCT Pub. Date: Dec. 29, 2022

(65) Prior Publication Data

US 2024/0247627 A1 Jul. 25, 2024

(30) Foreign Application Priority Data

Jun. 25, 2021 (JP) ................................. 2021-106054

(51) Int. Cl.
*F02M 55/02* (2006.01)
*F02M 55/00* (2006.01)

(52) U.S. Cl.
CPC .......... *F02M 55/02* (2013.01); *F02M 55/002* (2013.01)

(58) Field of Classification Search
CPC ...... F02M 47/02; F02M 47/00; F02M 55/007; F02M 55/004; F02M 55/005; F02M 55/002
(Continued)

(56) References Cited

U.S. PATENT DOCUMENTS 5,408,971 A * 4/1995 Jaeger .................. F02M 69/465 123/456
5,667,255 A * 9/1997 Kato ....................... F16L 41/12 285/133.4

(Continued)

FOREIGN PATENT DOCUMENTS

CN 101493063 A * 7/2009 ........... F02M 55/002
CN 209469493 U * 10/2019

(Continued)

OTHER PUBLICATIONS

International Search Report and Written Opinion of the International Searching Authority for International Application No. PCT/JP2022/021652, dated Aug. 16, 2022, with English translation.

(Continued)

*Primary Examiner* — George C Jin
*Assistant Examiner* — Teuta B Holbrook
(74) *Attorney, Agent, or Firm* — Birch, Stewart, Kolasch & Birch, LLP

(57) ABSTRACT

This fuel pressure accumulating device comprises: a fuel pressure accumulating unit inside which a pressure accumulating space is provided; a fuel inflow unit which is fitted to the fuel pressure accumulating unit and through which fuel can flow into the pressure accumulating space; a fuel outflow unit which is fitted to the fuel pressure accumulating unit and through which the fuel can flow from the pressure accumulating space; and a fuel storage unit which is provided in the fuel pressure accumulating unit, and which (Continued)

stores fuel that has leaked to a position in the fuel pressure accumulating unit where the fuel inflow unit is fitted, and a position in the fuel pressure accumulating unit where the fuel outflow unit is fitted.

12 Claims, 6 Drawing Sheets

(58) Field of Classification Search
USPC ................................ 123/447, 467, 456, 470
See application file for complete search history.

(56) References Cited

U.S. PATENT DOCUMENTS 8,997,715 B2 4/2015 Worthington et al.
2005/0115545 A1* 6/2005 Kawasaki ............ F02M 55/025 123/456
2011/0023853 A1 2/2011 Lund
2012/0186560 A1 7/2012 Lund
2012/0210980 A1* 8/2012 Bedekar ............... F02M 55/004 123/456
2014/0000562 A1 1/2014 Eklund et al.
2014/0102415 A1* 4/2014 Wyban ................. F02M 63/029 123/456

FOREIGN PATENT DOCUMENTS

DE 10 2008 035 490 A1 2/2010
DE 102014111202 A1 * 2/2015 ........... F02M 55/002
DE 102015014270 A1 * 5/2016 ........... F02M 55/002
EP 1 150 006 A2 10/2001
FI 108070 B * 11/2001 ........... F02M 55/002
FI 119702 B * 2/2009
JP 9-42108 A 2/1997
JP 2014-508244 A 4/2014
JP 5913106 B2 4/2016
KR 10-2009-0082312 A 7/2009

OTHER PUBLICATIONS

Extended European Search Report for European Application No. 22828146.5, dated Aug. 12, 2024.
Korean Office Action for Korean Application No. 10-2023-7037274, dated Apr. 9, 2025, with English translation.

* cited by examiner

FUEL PRESSURE ACCUMULATING DEVICE

TECHNICAL FIELD

The present disclosure relates to a fuel pressure accumulating device applied to an internal combustion engine.

BACKGROUND ART

For example, a common rail type fuel injection device applied to a diesel engine includes a fuel pump, a common rail (fuel pressure accumulating device), and a fuel injector. The fuel pump sucks a fuel from the fuel tank, pressurizes the fuel, and supplies the fuel to the common rail as a high-pressure fuel. The common rail maintains the high-pressure fuel supplied from the fuel pump at a predetermined pressure. The fuel injector opens and closes an injection valve to inject the high-pressure fuel from the common rail into a combustion chamber of the diesel engine. The common rail is an accumulator that maintains a high-pressure fuel at a predetermined pressure, and is connected to a fuel pump and a plurality of fuel injectors. As such a common rail, for example, there are common rails disclosed in PTL 1.

CITATION LIST

Patent Literature

[PTL 1] Japanese Patent No. 5913106

SUMMARY OF INVENTION

Technical Problem

The number of fuel injectors corresponding to the number of cylinders of a diesel engine is connected to the common rail. Thus, some common rails have a total length of more than 2 m. In a case where a long common rail is configured with a single member, a dedicated large-scale processing facility is required, which increases the manufacturing cost. Therefore, it is conceivable that a common rail has a split structure. In general, in a common rail, a plurality of connectors are attached to rail portions, and a fuel injector is connected to each connector via a pipe. In this case, a fuel may leak from an attachment portion of the connector to the rail portion. In a case where the common rail has a split structure, the number of fuel leakage locations increases. Therefore, it is conceivable to cover the rail portion itself with a cover and to catch a fuel leaking from the attachment portion of the connector with the cover. However, this configuration has a problem that a size of the common rail is increased.

The present disclosure has been made to solve the above-described problems, and an object of the present disclosure is to provide a fuel pressure accumulating device capable of recovering a leaked fuel and suppressing an increase in the size of the device.

Solution to Problem

In order to achieve the object, according to the present disclosure, there is provided a fuel pressure accumulating device including a fuel pressure accumulator in which a pressure accumulating space is provided; a fuel inflow portion that is attached to the fuel pressure accumulator and allows a fuel to flow into the pressure accumulating space; a fuel outflow portion that is attached to the fuel pressure accumulator and allows the fuel to flow out from the pressure accumulating space; and a fuel storage portion that is provided in the fuel pressure accumulator, and stores the fuel that has leaked at an attachment position of the fuel inflow portion in the fuel pressure accumulator and an attachment position of the fuel outflow portion in the fuel pressure accumulators.

Advantageous Effects of Invention

According to the fuel pressure accumulating device of the present disclosure, it is possible to recover a leaked fuel, and it is possible to suppress an increase in the size of the device.

DESCRIPTION OF EMBODIMENTS

Hereinafter, a preferred embodiment of the present disclosure will be described in detail with reference to the drawings. The present disclosure is not limited by the embodiment, and in a case where there are a plurality of embodiments, the present disclosure also includes a configuration in which the respective embodiments are combined with each other. In addition, constituents in the embodiment include constituents that can be easily assumed by those skilled in the art, constituents that are substantially the same, and constituents having a so-called equivalent range.

<Fuel Injection Device>

Figure 1:
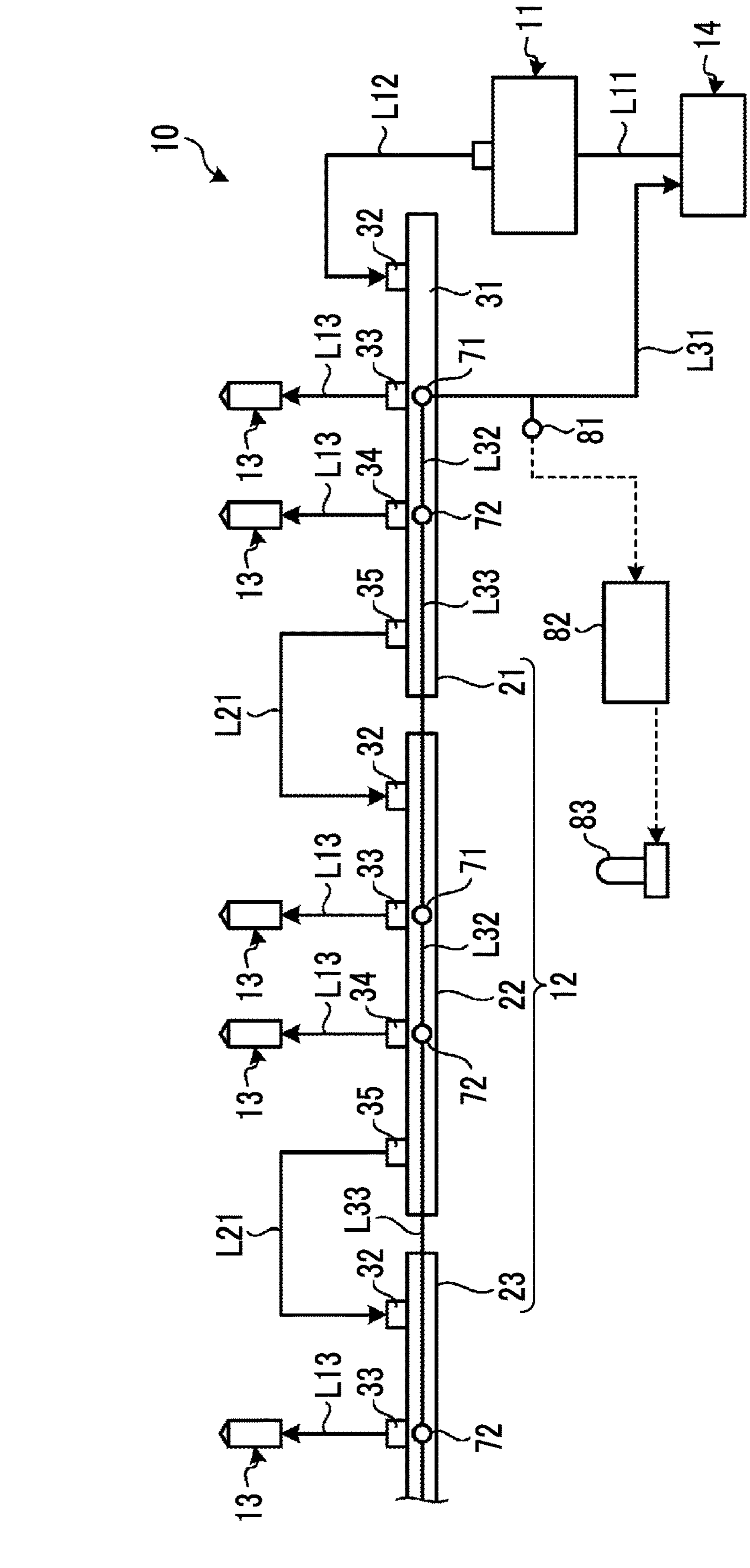
FIG. 1 is a schematic configuration diagram illustrating a fuel injection device according to the present embodiment.

FIG. 1 is a schematic configuration diagram illustrating a fuel injection device of the present embodiment.

As illustrated in FIG. 1, a fuel injection device 10 is attached to a diesel engine (internal combustion engine). The fuel injection device 10 includes a fuel pump 11, a common rail (fuel pressure accumulating device) 12, and a plurality of fuel injectors 13.

A fuel tank 14 is connected to the fuel pump 11 via a fuel line L11. The fuel pump 11 sucks a fuel stored in the fuel tank 14 from the fuel line L11 and pressurizes the fuel to generate a high-pressure fuel. The common rail 12 is connected to the fuel pump 11 via a fuel high-pressure line L12. The common rail 12 includes a plurality of rail portions 21, 22, and 23. The number of rail portions 21, 22, and 23 is appropriately set according to a form of the diesel engine. The plurality of rail portions 21, 22, and 23 are connected in series via connection lines L21 and L22. The plurality of rail portions 21, 22, and 23 may be connected in parallel via connection lines. The common rail 12 adjusts the high-pressure fuel supplied from the fuel pump 11 to a predetermined pressure. The fuel injectors 13 are connected to the common rail 12 via a plurality of fuel supply lines L13. The fuel injector 13 opens and closes the injection valve to inject the high-pressure fuel in the common rail 12 into each cylinder (combustion chamber) of the diesel engine.

<Fuel Pressure Accumulating Device>

Figure 2:
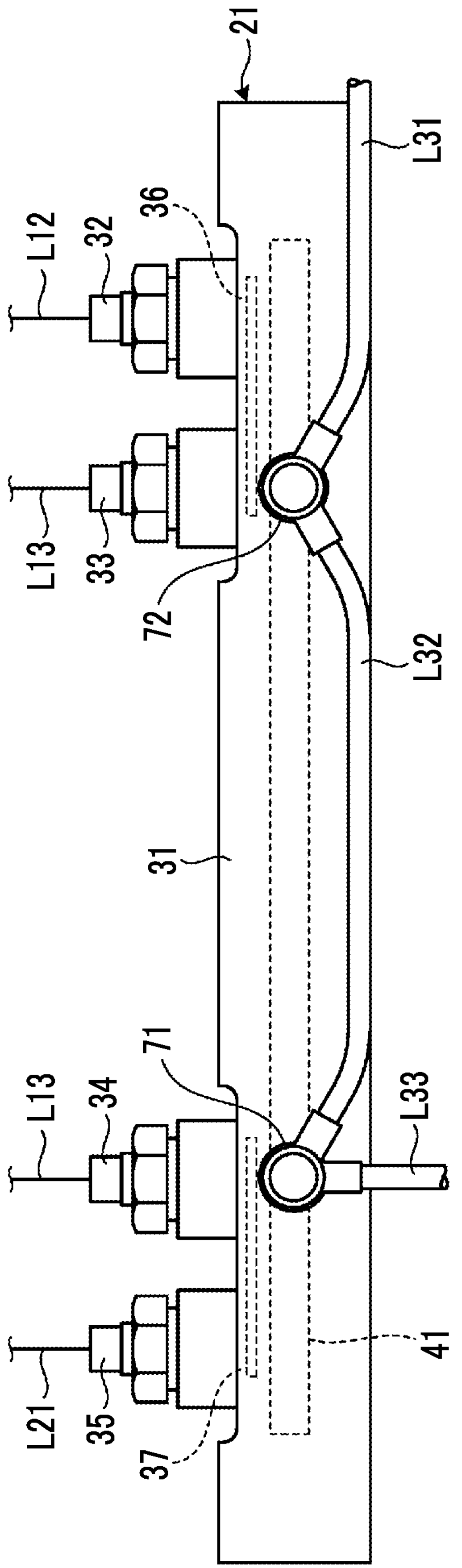
FIG. 2 is a front view illustrating a fuel pressure accumulating device of the present embodiment.

FIG. 2 is a front view illustrating the fuel pressure accumulating device of the present embodiment.

The common rail 12 as a fuel pressure accumulating device includes a plurality of rail portions 21, 22, and 23. However, the common rail 12 may include a single rail portion 21. In this case, the fuel pressure accumulating device is the common rail 12, and is also the single rail portion 21. Since the rail portions 21, 22, and 23 have substantially the same configuration, the rail portion 21 will be described in detail below.

As illustrated in FIGS. 1 and 2, the rail portion 21 includes a fuel pressure accumulator 31, a fuel inflow portion 32, fuel outflow portions 33, 34, and 35, and fuel storage portions 36 and 37.

The fuel pressure accumulator 31 is a pressure vessel having a long shape. A pressure accumulating space 41 is provided inside the fuel pressure accumulator 31. In the fuel pressure accumulator 31, one fuel inflow portion 32 and three fuel outflow portions 33, 34, and 35 are attached at intervals in the longitudinal direction. However, the number of the fuel outflow portions 33, 34, and 35 is not limited to three. The fuel inflow portion 32 can cause a fuel to flow from the outside into the pressure accumulating space 41. The fuel outflow portions 33, 34, and 35 can cause the fuel to flow out from the pressure accumulating space to the outside.

In the rail portion 21, the fuel inflow portion 32 is connected to the fuel high-pressure line L12 from the fuel pump 11 (refer to FIG. 1). The fuel injectors 13 (refer to FIG. 1) are connected to the fuel outflow portions 33 and 34 via the fuel supply lines L13. The fuel outflow portion 35 is connected to the fuel inflow portion 32 of the fuel pressure accumulator 31 in the rail portion 22 that is disposed adjacently via the connection line L21.

The fuel storage portions 36 and 37 are provided in the fuel pressure accumulator 31. The fuel storage portions 36 and 37 store a fuel that has flowed out at the attachment position of the fuel inflow portion 32 in the fuel pressure accumulator 31 and at the attachment positions of the fuel outflow portions 33, 34, and 35 in the fuel pressure accumulator 31. The fuel storage portion 36 stores the fuel that has flowed out from the fuel inflow portion 32 and the fuel outflow portion 33 in the fuel pressure accumulator 31. The fuel storage portion 37 stores the fuel that has flowed out from the fuel outflow portions 34 and 35 in the fuel pressure accumulator 31.

<Rail Portion>

Figure 3:
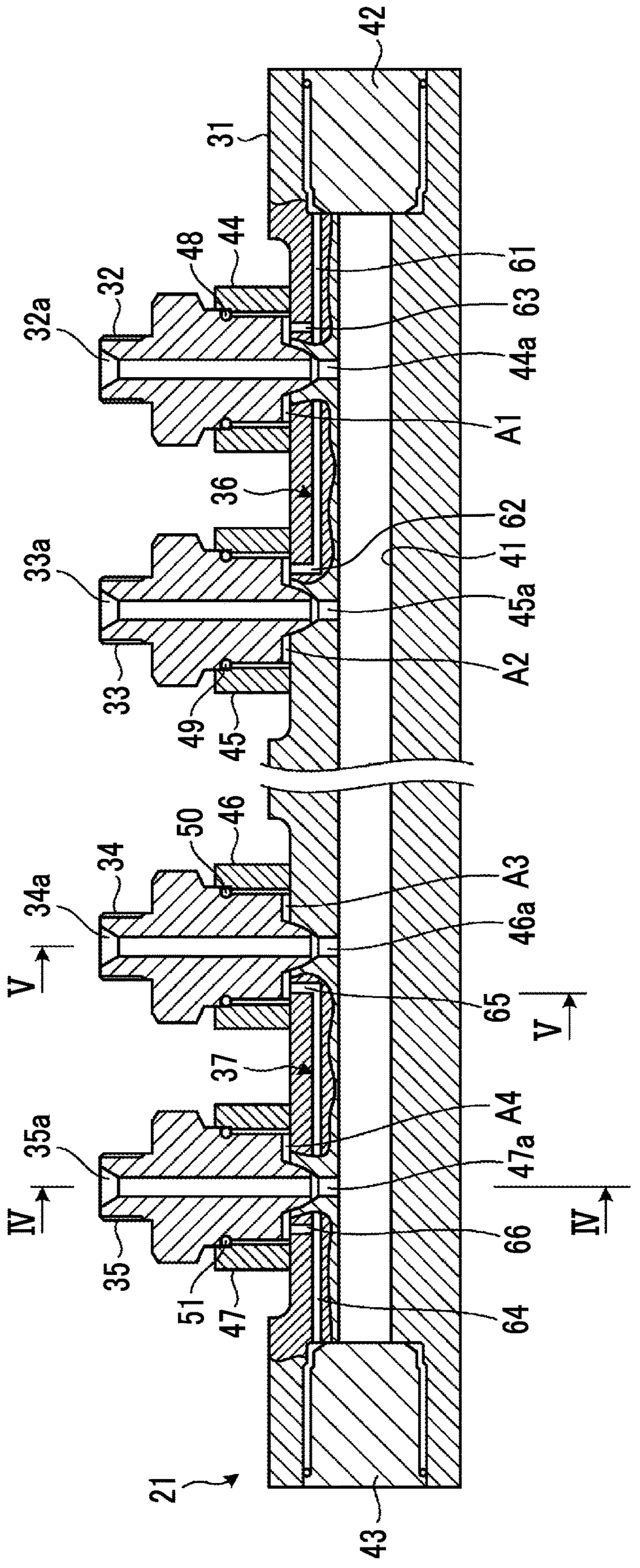
FIG. 3 is a vertical cross section illustrating a rail portion.
Figure 4:
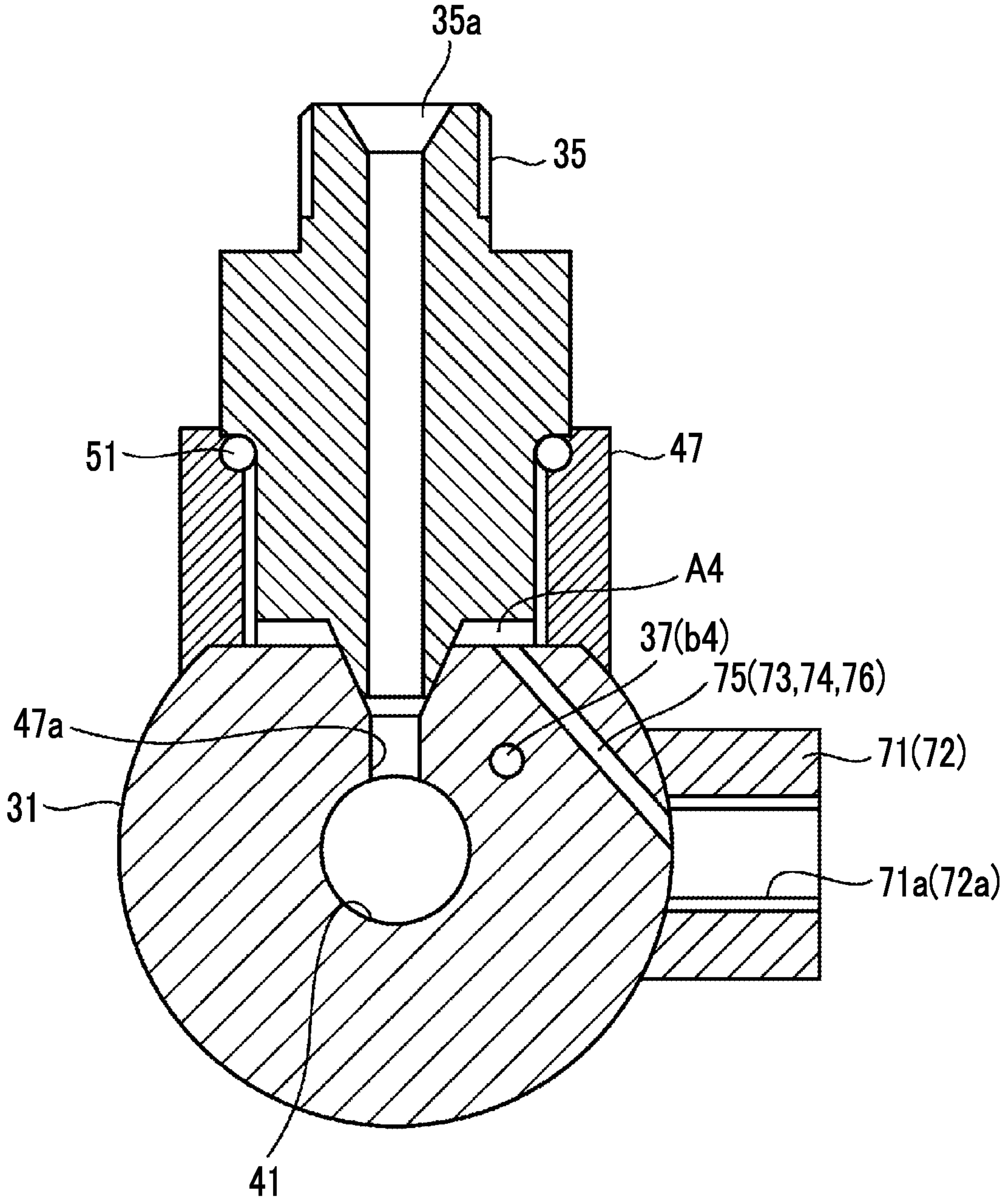
FIG. 4 is a sectional view taken along line IV-IV in FIG. 3.
Figure 5:
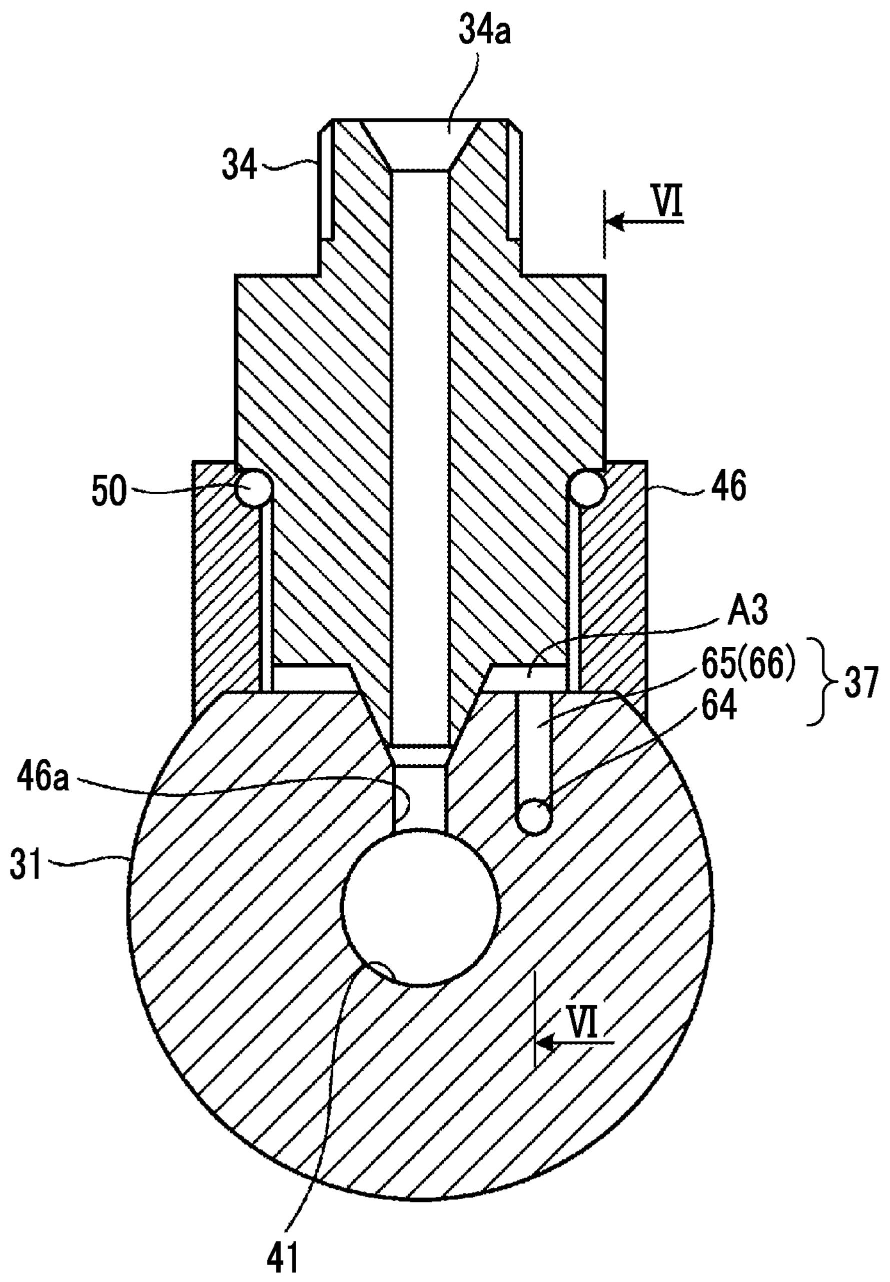
FIG. 5 is a sectional view taken along line V-V in FIG. 3.
Figure 6:
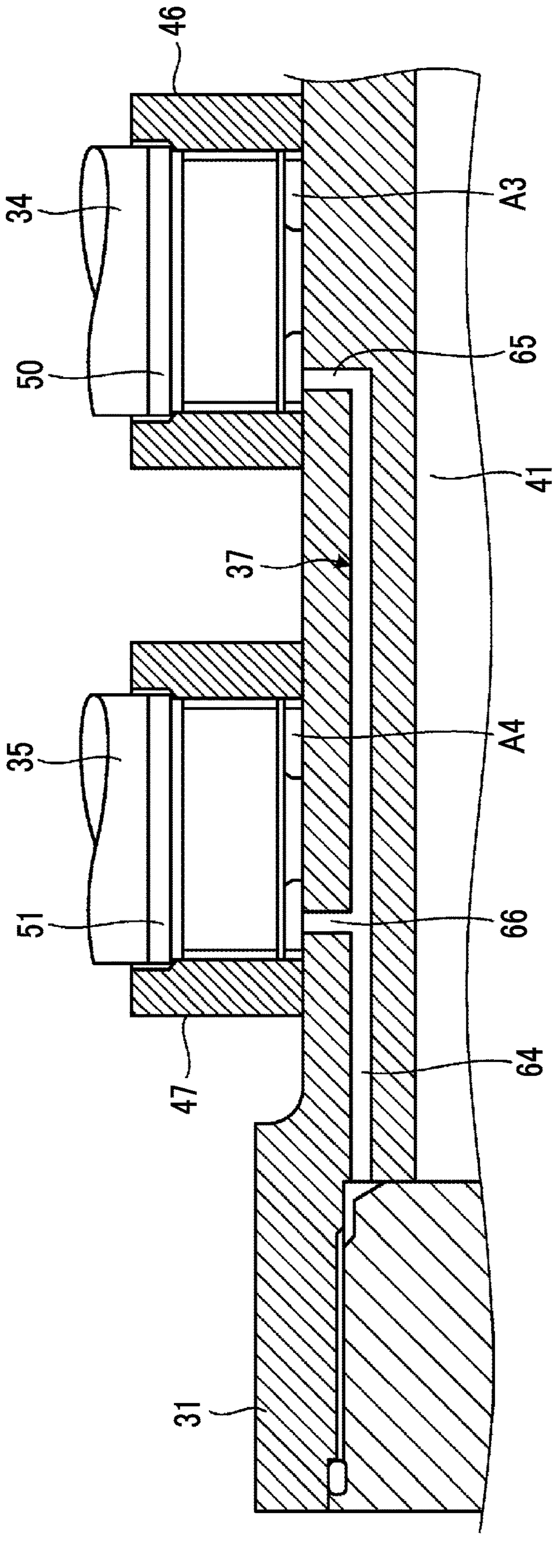
FIG. 6 is a sectional view taken along line VI-VI in FIG. 5.

FIG. 3 is a vertical cross section illustrating a rail portion, FIG. 4 is a sectional view taken along line IV-IV in FIG. 3, FIG. 5 is a sectional view taken along line V-V in FIG. 3, and FIG. 6 is a sectional view taken along line VI-VI in FIG. 5.

As illustrated in FIGS. 3 and 4, the fuel pressure accumulator 31 is provided with the pressure accumulating space 41 penetrating in the longitudinal direction. The pressure accumulating space 41 is provided in the longitudinal direction, and respective end portions thereof in the longitudinal direction are closed by plugs 42 and 43. The fuel inflow portion 32 and the fuel outflow portions 33, 34, and 35 are, for example, connectors, and fuel flow holes 32*a*, 33*a*, 34*a*, and 35*a* are formed in the centers thereof. Although the plugs 42 and 43 close the pressure accumulating space 41 by being fixed to the end portions thereof in the fuel pressure accumulator 31. However, a seal member such as an O-ring is provided between the pressure accumulating space 41 and the plugs 42 and 43, or does not need to be provided.

Tubular attachment portions 44, 45, 46, and 47 are fixed to the fuel pressure accumulators 31 at intervals in the longitudinal direction. The tubular attachment portions 44, 45, 46, and 47 are disposed in a direction orthogonal to the longitudinal direction of the pressure accumulating space 41. Axial end portions of the fuel inflow portion 32 and the fuel outflow portions 33, 34, and 35 are fitted and fixed to the tubular attachment portions 44, 45, 46, and 47 via O-rings (seal members) 48, 49, 50, and 51. Here, the O-rings 48, 49, 50, and 51 are provided between the fuel inflow portion 32 and the fuel outflow portions 33, 34, and 35 and the tubular attachment portions 44, 45, 46, and 47, but does not need to be provided. In the fuel pressure accumulator 31, communication holes 44*a*, 45*a*, 46*a*, and 47*a* that allow the pressure accumulating space 41 and the outside to communicate with each other are formed inside the tubular attachment portions 44, 45, 46, and 47. In the fuel inflow portion 32 and the fuel outflow portions 33, 34, and 35, the fuel flow holes 32*a*, 33*a*, 34*a*, and 35*a* communicate with the pressure accumulating space 41 through the communication holes 44*a*, 45*a*, 46*a*, and 47*a*.

As illustrated in FIGS. 3, 5, and 6, for example, the outer peripheral portions of the fuel inflow portion 32 and the fuel outflow portions 33, 34, and 35 are screw-fastened to the inner peripheral portions of the tubular attachment portions 44, 45, 46, and 47. In this case, the O-rings 48, 49, 50, and 51 are interposed between the fuel inflow portion 32 and the fuel outflow portions 33, 34, and 35 and the tubular attachment portions 44, 45, 46, and 47. Space regions A1, A2, A3, and A4 defined by the fuel inflow portion 32, the fuel outflow w portion 33, 34, 35, the tubular attachment portions 44, 45, 46, 47, the O-ring 48, 49, 50, 51, and the fuel pressure accumulator 31 are formed. For example, the fuel leaking from the connecting portions between the fuel flow holes 32*a*, 33*a*, 34*a*, 35*a* and the communication holes 44*a*, 45*a*, 46*a*, 47*a* flows to the space regions A1, A2, A3, and A4 that are attachment positions of the fuel inflow portion 32 and the fuel outflow portions 33, 34, and 35.

The fuel storage portions 36 and 37 communicate with the space regions A1, A2, A3, and A4, and store the leaked fuel in the space regions A1, A2, A3, and A4. The fuel storage portion 36 is provided to correspond to the fuel inflow portion 32 and the fuel outflow portion 33, and the fuel storage portion 37 is provided to correspond to the fuel outflow portions 34 and 35. The fuel storage portion 36 has a first flow path 61 and second flow paths 62 and 63. The fuel storage portion 37 has a first flow path 64 and second flow paths 65 and 66.

The first flow path 61 of the fuel storage portion 36 is parallel to the pressure accumulating space 41 and is provided in the longitudinal direction of the fuel pressure accumulator 31. The first flow path 61 is provided between the fuel inflow portion 32 and the fuel outflow portion 33, and the pressure accumulating space 41. The second flow path 62 of the fuel storage portion 36 allows the first flow path 61 to communicate with the space region A1, and the second flow path 63 allows the first flow path 61 to communicate with the space region A2. The first flow path 64 of the fuel storage portion 37 is parallel to the pressure accumulating space 41 and is provided in the longitudinal direction of the fuel pressure accumulator 31. The first flow path 64 is provided between the fuel outflow portions 34 and 35 and the pressure accumulating space 41. The second flow path 65 of the fuel storage portion 37 allows the first flow path 64 to communicate with the space region A3, and the second flow path 66 allows the first flow path 64 to communicate with the space region A4.

As illustrated in FIGS. 1 and 4, the rail portion 21 is provided with a fuel return line L31 that returns the fuel stored in the fuel storage portions 36 and 37 to the fuel tank 14 (refer to FIG. 1).

In the fuel pressure accumulator 31, connectors 71 and 72 are fixed adjacent to the fuel inflow portion 32 and the fuel outflow portions 33, 34, and 35. The connector 71 is disposed to correspond to the fuel storage portion 36, and the connector 72 is disposed to correspond to the fuel storage portion 37. Fuel discharging holes 71*a* and 72*a* are formed in the connectors 71 and 72. The fuel discharging holes 71*a* and 72*a* communicate with the space regions A1, A2, A3, and A4 via the communication holes 73, 74, 75, and 76 formed in the fuel pressure accumulator 31. However, the fuel discharging holes 71*a*, 72*a*, 73*a*, and 74*a* may communicate with the fuel storage portions 36 and 37 via the communication holes.

The connectors 71 and 72 are connected to each other via the connection line L32. The connectors 71 and 72 of the rail portions 21 and 22 disposed adjacent to each other are connected to each other via the connection line L33. The fuel return line L31 is connected to the connector 71 of the rail portion 21. The fuel return line L31 and the connection lines L32 and L33 are pipes.

The fuel return line L31 is provided with a fuel leakage detector 81 that detects the presence or absence of a fuel. The fuel leakage detector 81 is connected to a control device 82. An alarm device (display device) 83 is connected to the control device 82. When the fuel leakage detector 81 detects the fuel in the fuel return line L31, the fuel leakage detector 81 outputs a detection signal to the control device 82. When the detection signal is input from the fuel leakage detector 81, the control device 82 operates the alarm device 83 to issue an alarm.

Instead of or in addition to the alarm device 83, a display device such as a display panel or a speaker may be provided. The fuel leakage detector 81 may be provided in the space regions A1, A2, A3, and A4, the fuel storage portions 36 and 37, and the like to specify a leak position.

Thus, in the rail portion 21, the high-pressure fuel supplied to the fuel pressure accumulator 31 flows from the fuel inflow portion 32 into the pressure accumulating space 41 and is pressure-accumulated. The high-pressure fuel in the pressure accumulating space 41 flows out from the fuel outflow portions 33, 34, and 35 to the outside when necessary.

The high-pressure fuel in the pressure accumulating space 41 may leak from the attachment positions of the fuel inflow portion 32 and the fuel outflow portions 33, 34, and 35. The high-pressure fuel leaking from the attachment positions of the fuel inflow portion 32 and the fuel outflow portions 33, 34, and 35 is reduced in pressure, flows to the space regions A1, A2, A3, and A4, and is stored in the fuel storage portions 36 and 37. The fuel stored in the space regions A1, A2, A3, and A4 and in the fuel storage portions 36 and 37 is collected in the connectors 71 and 72 via the connection lines L32 and L33, and is returned to the fuel tank 14 through the fuel return line L31.

In this case, the fuel leakage detector 81 detects the fuel in the fuel return line L31, and the control device 82 operates the alarm device 83 to issue an alarm. That is, the control device 82 operates the alarm device 83 to notify the surroundings of the leakage of the fuel from the attachment positions of the fuel inflow portion 32 and the fuel outflow portions 33, 34, and 35.

[Actions and Effects of Present Embodiment]

A fuel pressure accumulating device according to a first aspect includes a fuel pressure accumulator 31 provided with a pressure accumulating space 41 inside, a fuel inflow portion 32 attached to the fuel pressure accumulator 31 and allowing a fuel to flow into the pressure accumulating space 41, fuel outflow portions 33, 34, and 35 attached to the fuel pressure accumulator 31 and allowing the fuel to flow out from the pressure accumulating space 41, and fuel storage portions 36 and 37 provided in the fuel pressure accumulator 31 and storing the fuel that has leaked at an attachment position of the fuel inflow portion 32 in the fuel pressure accumulator 31 and attachment positions of the fuel outflow portions 33, 34, and 35 in the fuel pressure accumulator 31.

According to the fuel pressure accumulating device of the first aspect, when the fuel leaks from the attachment position of the fuel inflow portion 32 in the fuel pressure accumulator 31 or the attachment positions of the fuel outflow portions 33, 34, and 35 in the fuel pressure accumulator 31, the leaked fuel is stored in the fuel storage portions 36 and 37. Therefore, the leaked fuel can be properly recovered. Since the fuel storage portions 36 and 37 are provided in the fuel pressure accumulator 31, a size of the rail portions 21, 22, and 23 is not increased, and thus the increase in the size of the device can be suppressed.

In the fuel pressure accumulating device according to a second aspect, the pressure accumulating space 41 is provided in a longitudinal direction of the fuel pressure accumulator 31, and the fuel storage portions 36 and 37 include first flow paths 61 and 64 that are parallel to the pressure accumulating space 41 and provided in the longitudinal direction of the fuel pressure accumulator 31, and second flow paths 62, 63, 65, and 66 through which the first flow paths 61 and 64 communicate with the attachment positions. As a result, the fuel storage portions 36 and 37 can be efficiently disposed.

In the fuel pressure accumulating device according to a third aspect, the fuel inflow portion 32 and the fuel outflow portions 33, 34, and 35 have connectors fitted to tubular attachment portions 44, 45, 46, and 47 provided in the fuel pressure accumulator 31 via O-rings (seal members), and the second flow path communicates with a region defined by the tubular attachment portion, the seal member, and the connector. As a result, the fuel storage portions 36 and 37 can be separated from the pressure accumulating space 41 and can be compactly provided inside the fuel pressure accumulator 31.

The fuel pressure accumulating device according to a fourth aspect further includes a fuel return line L31 for returning the fuel stored in the fuel storage portions 36 and 37 to the fuel tank 14. Consequently, the fuel is recovered by the fuel return line L31, so that the leakage of the fuel to the outside can be prevented.

In the fuel pressure accumulating device according to a fifth aspect, the fuel return line L31 has a pipe having one end portion connected to the fuel storage portions 36 and 37 and the other end portion connected to the fuel tank 14. Consequently, the fuel return line L31 is configured with a pipe, and thus the device can be simplified.

The fuel pressure accumulating device according to a sixth aspect further includes a fuel leakage detector 81 that detects the presence or absence of the fuel in the fuel storage portions 36 and 37 or the fuel return line L31, and an alarm device (display device) 83 that performs display when the fuel leakage detector 81 detects the fuel. Consequently, when the fuel leaks from the attachment positions of the fuel inflow portion 32 and the fuel outflow portions 33, 34, and 35, an alarm is issued, so that the surroundings can be notified of leakage of the fuel.

In the fuel pressure accumulating device according to a seventh aspect, a plurality of fuel pressure accumulators 31 are disposed in series, and a fuel inflow portion 32 and a fuel outflow portion 35 in the fuel pressure accumulators 31 adjacent to each other are connected via a connection line L21. As a result, the common rail 12 can be divided and configured with the plurality of rail portions 21, 22, and 23.

A form of the fuel injection device 10 that a form of the common rail 12 are not limited to those in the above-described embodiment. For example, the number of the common rail 12 and the fuel injectors 13, a connection position of the fuel pump 11, and the like may be set as appropriate.

REFERENCE SIGNS LIST

10 Fuel injection device
11 Fuel pump
12 Common rail (fuel pressure accumulating device)
13 Fuel injector
14 Fuel tank
21, 22, 23 Rail portion
31 Fuel pressure accumulator
32 Fuel inflow portion
33, 34, 35 Fuel outflow portion
41 Pressure accumulating space
42, 43 Plug
44, 45, 46, 47 Tubular attachment portion
48, 49, 50, 51 O-ring (seal member)
61, 64 First flow path
62, 63, 65, 66 Second flow path
71, 72 connector
73, 74, 75, 76 Communication hole
81 Fuel leakage detector
82 Control device
83 Alarm device (display device)
A1, A2, A3, A4 Space region
L11 Fuel line
L12 Fuel high-pressure line
L13 Fuel supply line
L21 Connection line
L31 Fuel return line
L32, L33 Connection line

The invention claimed is:

1. A fuel pressure accumulating device comprising:

a fuel pressure accumulator is a cylindrical member with a long opening formed inside;

a fuel inflow portion that is attached to the fuel pressure accumulator and allows a fuel to flow into the long opening;

a fuel outflow portion that is attached to the fuel pressure accumulator and allows the fuel to flow out from the long opening; and a fuel storage portion that is provided in the fuel pressure accumulator, and stores the fuel that has leaked at an attachment position of the fuel inflow portion in the fuel pressure accumulator and an attachment position of the fuel outflow portion in the fuel pressure accumulator, wherein the fuel pressure accumulator consists of a single piece, the fuel storage portion is a flow path formed between an outer peripheral surface of the fuel pressure accumulator and an inner peripheral surface of the fuel pressure accumulator, wherein the long opening is provided in a longitudinal direction of the fuel pressure accumulator, and the fuel storage portion includes a first flow path that is parallel to the pressure accumulating space and provided in the longitudinal direction of the fuel pressure accumulator and a second flow path through which the first flow path communicates with the attachment position, at both ends of the fuel pressure accumulator, there is a seat surface for attaching a plug, both ends in the longitudinal direction of the first flow path and the long opening are formed on the seat surface, the longitudinal central axis of the first flow path is offset from the longitudinal central axis of the long opening, the entire region of the first flow path is formed on the side close to the longitudinal central axis of the long opening from the attachment position of the fuel inflow portion and the fuel outflow portion in the fuel pressure accumulator.

2. The fuel pressure accumulating device according to claim 1, wherein the fuel inflow portion and the fuel outflow portion have a connector that is fitted to a tubular attachment portion provided in the fuel pressure accumulator via a seal member, and the second flow path communicates with a region defined by the tubular attachment portion, the seal member, and the connector.

3. The fuel pressure accumulating device according to claim 2, further comprising:

a fuel return line that returns the fuel stored in the fuel storage portion to a fuel tank.

4. The fuel pressure accumulating device according to claim 2, wherein a plurality of the fuel pressure accumulators are disposed in series, and the fuel inflow portion and the fuel outflow portion in the fuel pressure accumulators adjacent to each other are connected via a fuel connection line.

5. The fuel pressure accumulating device according to claim 1, further comprising:

a fuel return line that returns the fuel stored in the fuel storage portion to a fuel tank.

6. The fuel pressure accumulating device according to claim 5, wherein the fuel return line has a pipe having one end portion connected to the fuel storage portion and the other end portion connected to the fuel tank.

7. The fuel pressure accumulating device according to claim 6, further comprising:

a fuel leakage detector that detects the presence or absence of the fuel in the fuel storage portion or the fuel return line; and a display device that performs display when the fuel leakage detector detects the fuel.

8. The fuel pressure accumulating device according to claim 6, wherein a plurality of the fuel pressure accumulators are disposed in series, and the fuel inflow portion and the fuel outflow portion in the fuel pressure accumulators adjacent to each other are connected via a fuel connection line.

9. The fuel pressure accumulating device according to claim 5, further comprising:

a fuel leakage detector that detects the presence or absence of the fuel in the fuel storage portion or the fuel return line; and a display device that performs display when the fuel leakage detector detects the fuel.

10. The fuel pressure accumulating device according to claim 9, wherein a plurality of the fuel pressure accumulators are disposed in series, and the fuel inflow portion and the fuel outflow portion in the fuel pressure accumulators adjacent to each other are connected via a fuel connection line.

11. The fuel pressure accumulating device according to claim 5, wherein a plurality of the fuel pressure accumulators are disposed in series, and the fuel inflow portion and the fuel outflow portion in the fuel pressure accumulators adjacent to each other are connected via a fuel connection line.

12. The fuel pressure accumulating device according to claim 1, wherein a plurality of the fuel pressure accumulators are disposed in series, and the fuel inflow portion and the fuel outflow portion in the fuel pressure accumulators adjacent to each other are connected via a fuel connection line.

* * * * *